April 14, 1953  E. M. BARR  2,635,155
SYNCHRONOUSLY-OPERATED SWITCH
Filed Aug. 20, 1949
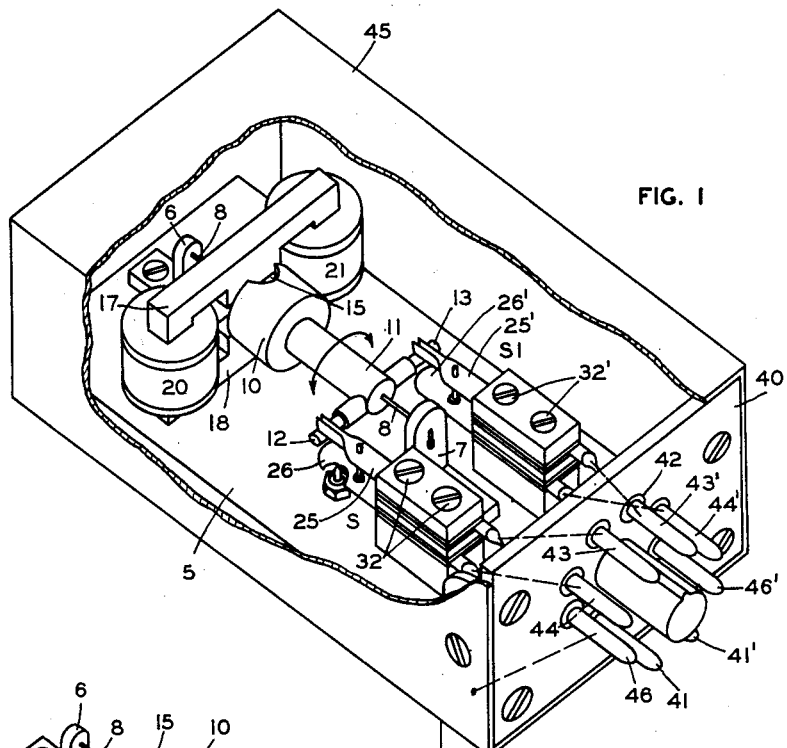
FIG. 1
FIG. 2
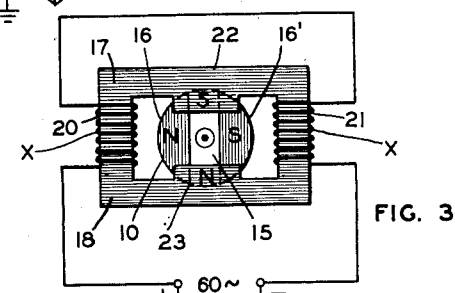
FIG. 3
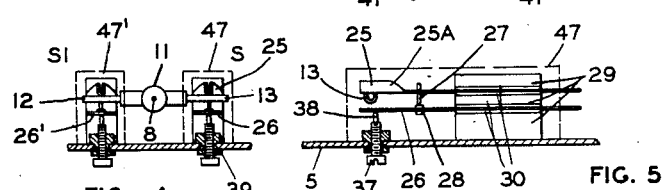
FIG. 4
FIG. 5
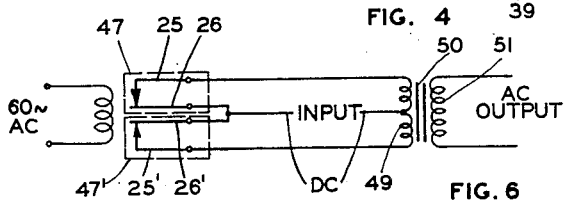
FIG. 6
*INVENTOR.*
ELLIOTT M. BARR
BY D. Clyde Jones
ATTORNEY Patented Apr. 14, 1953

2,635,155

UNITED STATES PATENT OFFICE 2,635,155

SYNCHRONOUSLY-OPERATED SWITCH

Elliott M. Barr, Rochester, N. Y., assignor to Taylor Instrument Companies, Rochester, N. Y., a corporation of New York Application August 20, 1949, Serial No. 111,380

4 Claims. (Cl. 200—91)

This invention relates to a new and improved type of synchronously operated switch especially adapted for use as a low level signal inverter in electrical measuring equipment.

Among the objects of this invention are to provide an inverter capable of functioning at lower signal levels than conventional inverters; to provide an inverter which is capable of operating over a wider range of frequencies and which is less sensitive to changes in the position in which it is mounted, than is the case with present devices; to provide a type of inverter that is less dependent on the use of special metals in its switch contacts; and to provide an inverter having sets of switch contacts that can be electrically isolated to perform separate functions independently of each other.

The various features and advantages of the invention will appear from the detailed description and claims when taken with the drawings in which:

Fig. 1 is an isometric view of the complete inverter of the present invention;

Fig. 2 is a detailed view of a part of the inverter showing the torsional spring having mounted thereon a cylindrical magnet as well as a crossarm actuator;

Fig. 3 is a phantom view showing the electrical driving motor for the torsional spring and the parts carried thereby;

Fig. 4 is an end view partially in section illustrating how the sets of switch contacts are operated by the cross-arm;

Fig. 5 is a side view of a pair or set of switch contacts of a set; and

Fig. 6 is a circuit diagram showing how the present inverter can cooperate with a transformer to translate a signal potential into a potential which varies cyclically in amplitude.

The present inverter comprises a rigid frame or base plate 5 having the uprights 6 and 7 mounted thereon. A straight wire 8 of Phospor bronze, beryllium copper or the like, has its ends securely mounted in the uprights 6 and 7 respectively to serve as a torsional spring. It is preferred to make the uprights 6 and 7 of a material having some degree of flexibility so that the spring wire 8 is continually under tension. A rotor unit comprising a cylindrical permanent magnet 10, and a brass rod attached together end to end in axial alinement, are apertured along their principal axes so that the torsional wire 8 can pass therethrough, the unit being then brazed or otherwise attached to the intermediate portion of the wire. The free end of the rod 11 carries the transversely extending rocker arms 12 and 13 to actuate sets of switching contact springs to be described.

The free end of the permanent magnet is notched to receive a brass strip 15, best shown in Fig. 3, to define pole-pieces 16 and 16'. These pole-pieces are positioned close to the poles of a stator unit adapted to be energized from a commercial current source which alternates at a commercial frequency such as sixty cycles. This stator which is securely mounted on the base, comprises a core of the shape indicated in Fig. 3. It is convenient to manufacture the core of two E-shaped parts 17 and 18 made of solid or laminated electromagnetic material. In practice, the free ends of the outside legs of these parts are ground or polished to make a good magnetic joint at X, X when these parts are assembled. During assembly of the core parts, the outside legs are inserted through the energizing coils 20 and 21 which are so connected in series with the A. C. power source that the stator poles 22 and 23 of the core are alternately north and south. As these stator poles alternately reverse from north to south, they develop an alternating quadrature field to react with the north and south poles of the magnet 10, causing the rotor unit to rock alternately clockwise and counterclockwise through an arc of limited length.

It has been mentioned that the rotor unit carries the rocker arms 12 and 13 which respectively actuate the switches S and S1. The switches S and S1 are herein illustrated as being identical in construction but it will be understood that the invention is not limited in this manner. The switch S comprises the beryllium copper contact springs 25 and 26 provided at their free ends with the rare metal contacts 27 and 28. The right ends of these springs are clamped in the spring assembly stack including the brass spacers 29 with a strip of insulation 30 such as mica placed at each surface of the springs 25 and 26 to insulate them from the rest of the assembly when the several parts of the stack are clamped together and are fastened on the base by the screws 32. The parts of switch S1 corresponding with those of switch S are identified by the same reference characters but in this instance they are primed.

As mentioned earlier, the rotor unit is provided with rocker arms 12 and 13 made entirely of nylon or other insulating material or these arms may be made of metal covered by an insulating sleeve. The rocker arms 12 and 13 project between the contact springs 25, 26 and 25', 26' respectively. Thus as the rotor oscillates in its given arc, the rocker arms 12 and 13 will alternately raise the contact springs 25 and 25' causing them to lift their contacts 27, 27' out of engagement with their mating contacts 28, 28' on their respective contact springs 26 and 26'. The tension in the contact springs 25, 25 will restore the contacts 27, 27' into engagement with their mating contacts 28, 28' when disengaged by the respective cross arms 12 and 13.

It will be seen that a portion of the movable end of each of the contact springs 25, 25' is provided with ears 25A and 25A' folded into channel shape to give rigidity to the mentioned portions of these springs. If the moving contact 27 is mounted in the mentioned fold, this contact will have little or no wiping action on its mating contact 28. On the other hand if the contact 27 is located to the right of the fold as indicated in Fig. 5, the flexing of the contact spring 25 as it operates, will cause the contact 27 to have a swinging motion which introduces considerable wiping action on contact 28. Since the amount of wiping action can be thus varied in the design of the contact springs, the complete device is not limited to any single contact material but any one of a wide variety of metals or alloys can be utilized depending on the result desired.

The portion of the oscillation or cycle at which the contacts 27 and 28 close, is controlled by the set screw 37 adjustable through the base 5 to determine the position of the contact spring 25 with respect to its related contact spring. The set screw is preferably tipped with glass at 38 to insulate the spring 25 from the base and a lock nut 39 on the set screw assures permanent adjustment.

The contact springs 25, 25 and 26, 26' of the inverter can be connected, in any conventional manner, into the electrical system of which it is a part. However, it is preferred to provide the inverter with an octal type plug-in base having pin terminals similar to those used in the base of conventional radio tubes which can be readily inserted or removed from a well-known socket. In this preferred construction the end of the frame 5 adjacent the spring assembly stacks, has secured at right angles thereto a metal upright plate 40. The octal base is mounted on the plate 40, with the pin terminals of the base projecting through glass eyelets 42. As shown in dotted lines Fig. 1 the pin terminal 43 is electrically connected to the contact spring 25 while the pin terminal 45 is electrically connected to the contact spring 26. The pin terminal 46 is adapted to be connected to ground to reduce the electrostatic effects between pin terminals 43, 44 and pin terminal 41. The arrangement of the pin terminals 43', 44', 41' and their connection to the contact springs 25' and 26' is identical with that already described. Pins 41, 41' plug into the A. C. source.

It will be noted that the magnetic field developed by the poles of the motor are in such orientation that they do not link with the closed loops formed by the mating contact springs 25, 26 and 25', 26'. This arrangement reduces stray pick-up from the magnetic field, to a minimum. Any distorted lines of flux from this source or other sources can be further decreased by a soft iron cover 45 (Fig. 1) over both switches S and S'. However, it is preferred to cover each switch with an inexpensive non-ferrous box 47 (Figs. 4 and 5) to reduce electrostatic effects produced by the potentials that excite the coils 20 and 21.

As indicated diagrammatically in Fig. 6, the switches S and S1 are operated alternately in synchronism with the exciting voltage which is shown as being sixty cycle or other commercial frequency. If the input is a D.-C. potential, as the switches alternately open and close, the input potential is alternately connected across one of the halves of the primary winding 49 of a transformer with which the inverter cooperates thus producing a reversal of flux in the transformer core 50 which in turn produces an A.-C. signal potential in the secondary winding 51 of the transformer.

This signal potential observed at the terminals of the secondary winding 51 of the transformer will be characterised by a frequency which is identical with that of the exciting A.-C. voltage. The amplitude of this output signal will be determined by the magnitude of the D.-C. input signal. It should be pointed out that if the input signal is of very low frequency, resulting output signal will be a modulated wave the frequency of which is the same as that of the excitation voltage and the modulation envelope of which will be that of the input signal. The exciting frequency used with this invention need not be limited to 60 cycles but may be almost any frequency from D.-C. to about 500 cycles per second with the exception of only a small band of frequencies near the resonant frequency of the torsion spring 8 in which band it is undesirable to operate the device. The input signal may be either D. C. or an alternating potential, but best results are obtained where the frequency of an A. C. input is somewhat lower than the exciting frequency.

What I claim is:

1. In a synchronously operated switching device, a pair of fixed, spaced uprights having some degree of flexibility, a taut wire supported at its ends under tension on said uprights whereby the intermediate portion of said wire can be torsionally rocked through a given arc, means for cyclically rocking said portion of the wire alternately clockwise and counter-clockwise through said arc in synchronism with a given alternating source of power, a pair of contact springs rigidly supported in parallel relation adjacent a pair of their ends and having their other pair of ends free for relative movement, a given one of said contact springs having a relative rigid free end portion and a flexible intermediate portion, registering contacts on said contact springs, the amount of wiping action of said contacts being determined by the positioning of said contacts along said given contact spring in the rigid or flexible intermediate portion thereof, and means including said wire for periodically actuating said contact springs.

2. In a synchronously operated switching device, a single taut wire mounted with its ends tending to be drawn apart for rocking motion of its intermediate portion through a given arc, means for rocking said portion alternately clockwise and counter-clockwise through said arc in synchronism with a given alternating source of power, a pair of contact springs located at each side of said wire, a rod secured in coaxial relation on said wire, and cross arms projecting from said rod to engage said pairs of contact springs alternately for actuating the same.

3. In a synchronously operated switching device, a taut, torsional wire spring supported at its ends under tension for rocking movement of its intermediate portion through a given arc, a stator comprising means adapted to be energized from an alternating current source for generating a field alternating in synchronism with said source, a rotor comprising a permanent magnet having poles of opposite polarity at one end thereof extending into said alternating field, said rotor being secured to said spring to effect the rocking movement thereof, a set of contact springs at each side of said spring, and members projecting from opposite sides of said spring and actuated thereby to operate the respective sets of springs alternately.

4. In a synchronously operated switching device, a taut wire supported at its ends under tension for rocking movement of its intermediate portion through a given arc, a stator comprising a core provided with opposed pole pieces straddling said wire and a winding adapted to be energized from an alternating source for generating a field alternating in synchronism with said source, a rotor secured to said wire and comprising a permanent magnet having poles of opposite polarity at one end thereof, said poles in their normal position extending into said field adjacent said pole pieces but displaced therefrom, a set of contact springs mounted at each side of said wire, said sets of contact springs being more remotely located from said stator than said rotor, the principal planes of said contact springs being generally parallel to field lines of force passing therethrough, and actuating arms controlled by the rocking motion of said wire for operating said sets of contact springs alternately.

ELLIOTT M. BARR.

References Cited in the file of this patent

UNITED STATES PATENTS

| Number | Name | Date |
|---|---|---|
| 1,205,731 | Gerdien | Nov. 21, 1916 |
| 1,289,036 | Kent | Dec. 24, 1918 |
| 1,717,475 | Thompson | June 18, 1929 |
| 1,913,826 | Blosser | June 13, 1933 |
| 2,051,475 | Grandstaff | Aug. 18, 1936 |
| 2,163,195 | Edwards | June 20, 1939 |
| 2,445,401 | Langer | July 20, 1948 |
| 2,499,632 | Coake | Mar. 7, 1950 |
| 2,526,685 | Price | Oct. 24, 1950 |
| 2,546,284 | Weisbecker | Mar. 27, 1951 |